(12) United States Patent
Petricek (10) Patent No.: US 8,085,011 B1
(45) Date of Patent: *Dec. 27, 2011

(54) BOOST REGULATOR USING SYNTHETIC RIPPLE REGULATION

(75) Inventor: Shea Lynn Petricek, University Park, TX (US)

(73) Assignee: Intersil Americas Inc., Milpitas, CA (US)

( * ) Notice: Subject to any disclaimer, the term of this patent is extended or adjusted under 35 U.S.C. 154(b) by 842 days.

This patent is subject to a terminal disclaimer.

(21) Appl. No.: 12/134,910

(22) Filed: Jun. 6, 2008

Related U.S. Application Data (60) Provisional application No. 60/957,838, filed on Aug. 24, 2007.

(51) Int. Cl.
  *G05F 1/24* (2006.01)
(52) U.S. Cl. ........................................... 323/259
(58) Field of Classification Search .................. 323/247, 323/259, 265, 273, 282, 328, 344
  See application file for complete search history.

(56) References Cited

U.S. PATENT DOCUMENTS

| | | | |
|---|---|---|---|
| 4,413,224 A | 11/1983 | Krupka et al. | |
| 4,521,726 A | 6/1985 | Budnik | |
| 4,658,204 A | 4/1987 | Goodwin | |
| 4,801,859 A * | 1/1989 | Dishner | 323/224 |
| 5,399,958 A | 3/1995 | Iyoda | |
| 5,514,947 A | 5/1996 | Berg | |
| 5,705,919 A | 1/1998 | Wilcox | |
| 5,731,694 A | 3/1998 | Wilcox et al. | |
| 5,747,977 A | 5/1998 | Hwang | |
| 5,760,495 A | 6/1998 | Mekanik | |
| 5,770,940 A | 6/1998 | Goder | |
| 5,959,853 A | 9/1999 | Kos | |
| 6,064,187 A | 5/2000 | Redl et al. | |
| 6,147,478 A | 11/2000 | Skelton et al. | |
| 6,147,526 A | 11/2000 | Skelton et al. | |
| 6,166,527 A * | 12/2000 | Dwelley et al. | 323/222 |

(Continued)

FOREIGN PATENT DOCUMENTS

DE 3343883 A1 6/1984

(Continued)

OTHER PUBLICATIONS

Hara, N. et al. "Realization and Analysis of a New Switched-Capacitor Coilless Powersupply for One-Chip IC Implementation." Systems & Computers in Japan, Wiley, Hoboken, NJ, US. vol. 29, No. 12, Nov. 15, 1998 pp. 19-33 XP000821933.

*Primary Examiner* — Adolf Berhane
(74) *Attorney, Agent, or Firm* — Gary R. Stanford (57) ABSTRACT

A boost regulator for converting an input voltage to a higher output voltage including an inductor, an error circuit, a switching circuit, a ripple circuit, and a hysteretic comparator circuit. The inductor has a first end coupled to the input voltage and a second end. The error circuit determines an error of the output voltage and provides an error voltage indicative thereof. The switching circuit switches the second end of the inductor between the output voltage and ground as controlled by a pulse width modulation signal. The ripple circuit synthetically replicates ripple current through the inductor based on voltage applied across the inductor and provides a ripple voltage indicative thereof. The hysteretic comparator circuit develops the pulse width modulation signal based on comparing the ripple voltage within a hysteretic window voltage range based on the error voltage.

23 Claims, 8 Drawing Sheets

U.S. PATENT DOCUMENTS

| | | |
|---|---|---|
| 6,246,222 B1 | 6/2001 | Nilles et al. |
| 6,271,650 B1 | 8/2001 | Massie et al. |
| 6,307,360 B1 | 10/2001 | Kajiwara et al. |
| 6,362,607 B1 | 3/2002 | Wickersham et al. |
| 6,433,525 B2 | 8/2002 | Muratov et al. |
| 6,456,050 B1 | 9/2002 | Agiman |
| 6,495,995 B2 | 12/2002 | Groom et al. |
| 6,583,610 B2 | 6/2003 | Groom et al. |
| 6,791,306 B2 | 9/2004 | Walters et al. |
| 6,819,577 B1 | 11/2004 | Wiktor et al. |
| 6,825,644 B2 | 11/2004 | Kernahan et al. |
| 6,841,983 B2 | 1/2005 | Thomas |
| 6,922,044 B2 | 7/2005 | Walters et al. |
| 7,019,502 B2 | 3/2006 | Walters et al. |
| 7,106,036 B1 * | 9/2006 | Collins .................. 323/282 |
| 7,116,568 B1 * | 10/2006 | Birchenough ............ 363/132 |
| 7,132,820 B2 | 11/2006 | Walters et al. |
| 7,193,396 B2 * | 3/2007 | Orr ........................ 323/225 |
| 7,391,190 B1 * | 6/2008 | Rajagopalan ............ 323/271 |
| 7,394,231 B2 * | 7/2008 | Flatness et al. ............ 323/259 |
| 7,432,689 B2 * | 10/2008 | Miller et al. ............. 323/259 |
| 7,495,419 B1 * | 2/2009 | Ju .......................... 323/259 |
| 7,570,033 B1 * | 8/2009 | Ju .......................... 323/259 |
| 7,598,715 B1 * | 10/2009 | Hariman et al. ........... 323/271 |
| 7,696,735 B2 | 4/2010 | Oraw et al. |
| 7,737,668 B2 * | 6/2010 | Oswald et al. ............. 323/259 |
| 7,786,712 B2 | 8/2010 | Williams |
| 7,834,608 B2 * | 11/2010 | Cheng et al. .............. 323/299 |
| 7,932,709 B1 * | 4/2011 | Ling ...................... 323/285 |
| 2001/0035745 A1 | 11/2001 | Muratov et al. |
| 2003/0142519 A1 | 7/2003 | Walters et al. |
| 2004/0090804 A1 | 5/2004 | Lipcsei et al. |
| 2004/0196095 A1 | 10/2004 | Nonaka |
| 2009/0033289 A1 | 2/2009 | Xing et al. |
| 2009/0033293 A1 | 2/2009 | Xing et al. |
| 2009/0102440 A1 * | 4/2009 | Coles ..................... 323/271 |
| 2010/0026263 A1 * | 2/2010 | Moussaoui et al. ......... 323/283 |
| 2010/0123446 A1 * | 5/2010 | Cheng et al. .............. 323/288 |

FOREIGN PATENT DOCUMENTS

| | | |
|---|---|---|
| DE | 4206478 A1 | 9/1993 |
| EP | 0650250 A1 | 4/1995 |
| EP | 0883051 A1 | 12/1998 |
| EP | 1073187 A2 | 1/2001 |
| FR | 2610149 A1 | 7/1998 |
| WO | WO03065558 | 8/2003 |

* cited by examiner

BOOST REGULATOR USING SYNTHETIC RIPPLE REGULATION

CROSS-REFERENCE TO RELATED APPLICATIONS

This application claims the benefit of U.S. Provisional Application Ser. No. 60/957,838, filed on Aug. 24, 2007, which is herein incorporated by reference for all intents and purposes. This application is also related to application entitled "BUCK-BOOST REGULATOR" filed concurrently herewith at least one common inventor and which is commonly assigned, which is herein incorporated by reference for all intents and purposes.

DESCRIPTION OF THE RELATED ART

Many electronic devices require a source voltage which is greater than the source voltage the device. Battery powered devices, for example, have a battery providing a battery voltage within a predetermined range depending upon charge level, in which the highest voltage available is less than the source voltage needed for the device circuitry. A boost converter boosts voltage of a lower input voltage to a higher regulated voltage needed for device circuitry. It is desired to improve efficiency of a boost converter while minimizing voltage ripple.

SUMMARY OF THE PRESENT INVENTION

A boost regulator is disclosed which converts an input voltage to a higher output voltage and which includes an inductor, an error circuit, a switching circuit, a ripple circuit, and a hysteretic comparator circuit. The inductor has a first end coupled to the input voltage and a second end. The error circuit determines an error of the output voltage and provides an error voltage indicative thereof. The switching circuit switches the second end of the inductor between the output voltage and ground as controlled by a pulse width modulation signal. The ripple circuit synthetically replicates ripple current through the inductor based on voltage applied across the inductor and provides a ripple voltage indicative thereof. The hysteretic comparator circuit develops the pulse width modulation signal based on comparing the ripple voltage within a hysteretic window voltage range based on the error voltage.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
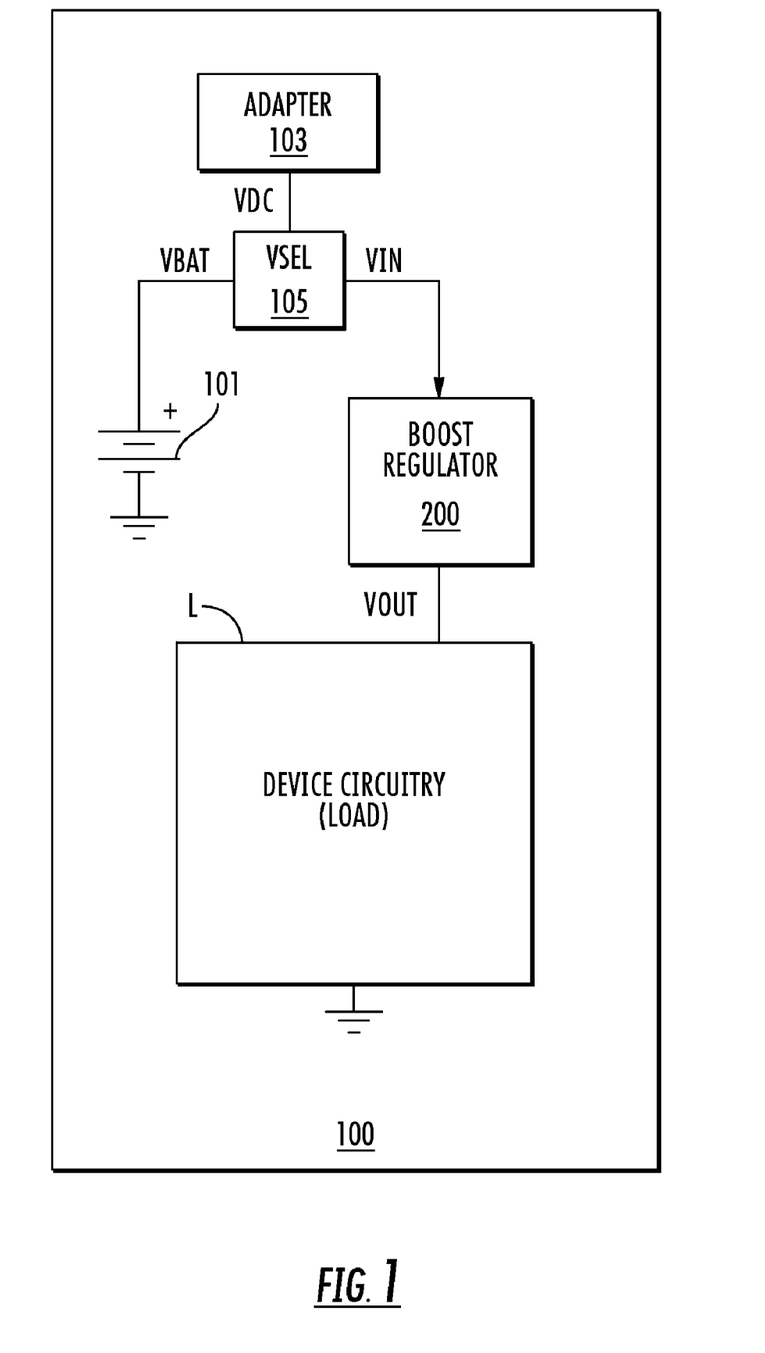
FIG. 1 is a block diagram of a battery-powered electronic device including a boost regulator implemented according to an exemplary embodiment.

FIG. 1 is a block diagram of a battery-powered electronic device 100 including a boost regulator 200 implemented according to an exemplary embodiment. The electronic device 100 includes a battery 101 providing a battery voltage VBAT to one input of a voltage select (VSEL) circuit 105, having another input receiving a DC voltage (VDC) from an adapter 103. The adapter 103 receives power from an external power source, such as an alternating current (AC) source (not shown), and converts to the VDC voltage. If the battery 101 is rechargeable, then the adapter 103 may include a battery charger for charging the battery 101 or a separate battery charger (not shown) may be included. The VSEL circuit 105 provides an input voltage VIN to an input of the boost regulator 200. The boost regulator 200 has an output providing an output voltage VOUT, which is used to provide source voltage to a load L, which generally includes the circuitry of the electronic device 100.

The primary functions of the electronic device 100 are performed by the load L which is the device circuitry in the illustrated configuration. In one embodiment the battery 101 is a rechargeable battery of any suitable type, such as a lithium-ion (Li-ion) battery, nickel-metal hydride (NiMH) battery, a nickel-cadmium (NiCd) battery, etc., used for providing power to an electronic device as understood by those of ordinary skill in the art. When the external power source is not available, the battery 101 provides the power to the device in which the VSEL circuit 105 generally operates to transfer the VBAT voltage as VIN to the boost regulator 200. In an alternative embodiment, the battery 101 may be a non-rechargeable battery, such as any type of dry cell-type, alkaline, carbon-zinc, etc., battery commonly used in portable electronic devices. In any case the voltage of VIN varies within a range below the desired regulated level of VOUT.

The electronic device 100 represents any type of battery-powered electronic device, including mobile, portable, or handheld devices, such as, for example, any type of personal digital assistant (PDA), personal computer (PC), portable computer, laptop computer, etc., cellular phone, personal media device, etc. The voltage VBAT of the battery 101 may vary within a certain voltage range which depends upon the type of battery and/or the number of battery cells. A Li-ion battery, for example, typically has a voltage range of 3V to 4.2V per cell. It is desired, however, that the voltage VOUT used to provide power to the load L maintain a relatively stable and regulated voltage level. For example, if it is desired that VOUT be maintained at approximately 12V with a Li-ion type battery 101 which ranges from 3 to 4.2V, then the boost regulator 200 boosts the lower battery voltage level to maintain VOUT at approximately 12V.

Figure 2:
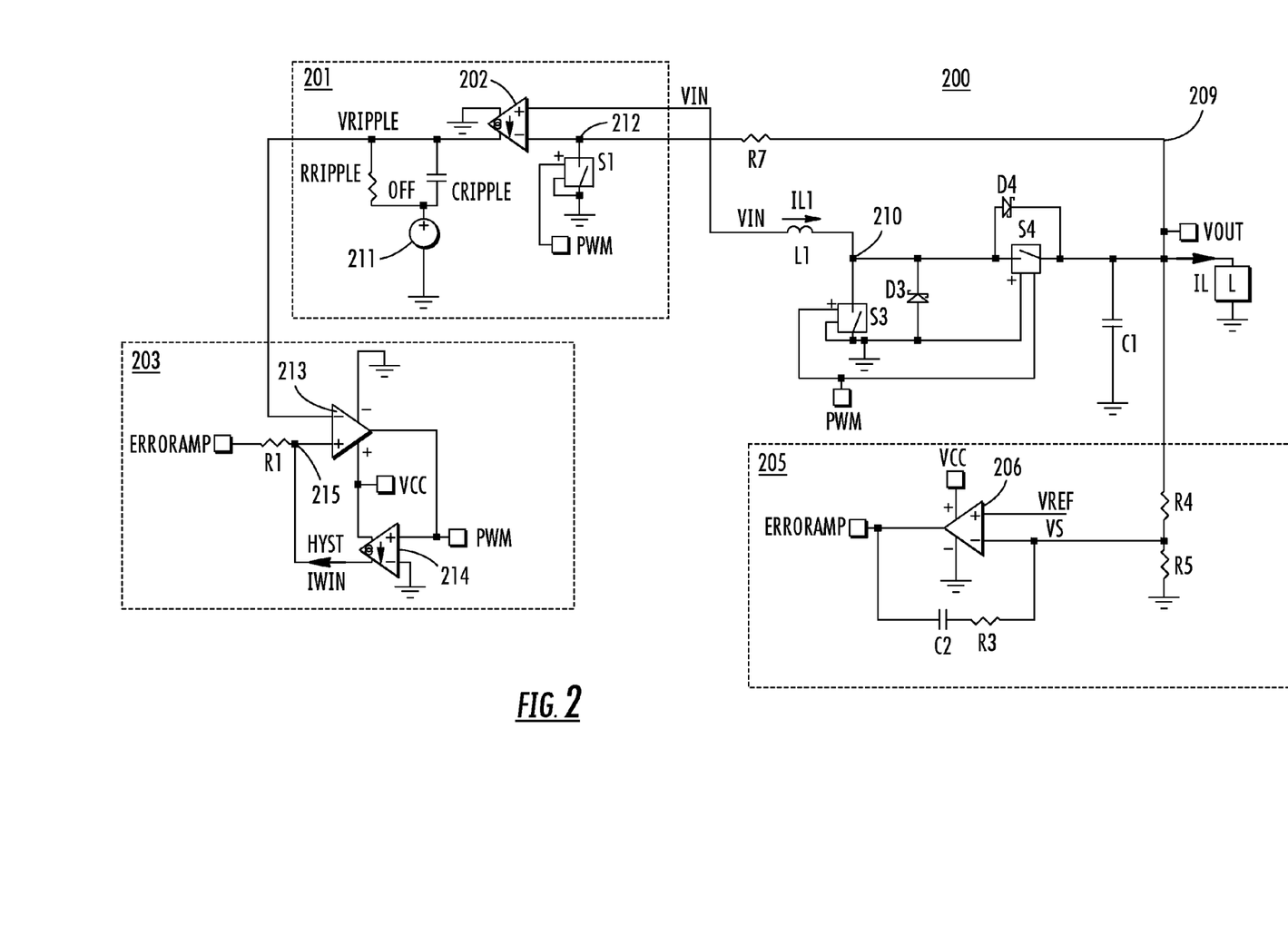
FIG. 2 is a more detailed schematic diagram of the boost regulator of FIG. 1 incorporating synthetic ripple regulation.

FIG. 2 is a more detailed schematic diagram of the boost regulator 200 incorporating synthetic ripple regulation. The basic boost converter includes an inductor L1 coupled between input voltage VIN and a node 210. Inductor current IL1 flows through the inductor L1. Electronic switches S3 and S4 are coupled to node 210 to control boost operation. The switched current terminals of switch S3 are coupled between node 210 and ground and the switched current terminals of switch S4 are coupled between node 210 and an output node 209 developing the output voltage VOUT. The switches S3 and S4 have control terminals receiving a pulse width modulation (PWM) voltage PWM. A capacitor C1 is coupled between VOUT and ground forming an output filter and a load L is coupled between VOUT and ground. Additional components are provided as desired, such as a Schottky diode D3 having an anode coupled to ground and a cathode coupled to node 210 and another Schottky diode D4 having an anode coupled to node 210 and a cathode coupled to output node 209. The voltage of VOUT is sensed with voltage divider R4 and R5 coupled in series between VOUT and ground forming an intermediate junction developing an output voltage sense signal VS. VS is compared with a reference voltage VREF by an error amplifier 206 within an error circuit 205, where the error amplifier 206 outputs a corresponding error signal ERRORAMP. A resistor R3 and a capacitor C2 are coupled in series between VS and ERRORAMP forming a compensation circuit in the feedback loop of the error amplifier 206. Other types of compensation circuits are known and contemplated.

A synthetic ripple generation circuit 201, including a transconductance amplifier 202, ripple capacitor CRIPPLE, a ripple resistor RRIPPLE, an offset voltage source 211 and a switch S1, performs synthetic ripple generation and generates a ripple voltage VRIPPLE. VOUT is provided to one end of a resistor a resistor R7 having its other end coupled to one input of the transconductance amplifier 202 at a node 212, where the transconductance amplifier 202 receives VIN at its other input. The switch S1 has its switched current terminals coupled between node 212 and ground and is controlled by the PWM voltage. CRIPPLE and RIPPLE are coupled in parallel between the output of the transconductance amplifier 202 providing VRIPPLE and a positive terminal of the voltage source 211 providing an offset voltage OFF. The negative terminal of voltage source 211 is coupled to ground. The voltage source 211 develops a suitable offset voltage OFF added to VRIPPLE.

A hysteretic comparator circuit 203 includes a comparator 213, a transconductance amplifier 214 and a resistor R1. VRIPPLE is provided to an inverting (−) input of the comparator 213 having its non-inverting (+) input coupled to a node 215 which is coupled to the output of the transconductance amplifier 214 and which develops a hysteresis voltage level HYST. The resistor R1 is coupled between the output of the error amplifier 206 providing ERRORAMP and the node 215 providing HYST. The output of the comparator 213 provides the PWM voltage which is provided to one input of the transconductance amplifier 214. The other input of the transconductance amplifier 214 is coupled to ground. In this manner, the transconductance amplifier 214 develops a window current TWIN at its output based on the voltage of PWM and the gain of the transconductance amplifier 214. A source voltage VCC is shown throughout the Figures relative to ground for providing source voltage to various components.

In operation, when PWM is asserted high by the comparator 213, S3 is closed and S4 is opened so that the inductor L1 is coupled between VIN and ground to develop current IL1 through the inductor L1. When PWM goes low, S3 is opened and S4 is closed so that current IL1 through the inductor L1 charges the output capacitor C1 for developing the output voltage VOUT on output node 209. The error circuit 205 compares VS, or a sampled version of VOUT, with VREF and develops the error signal ERRORAMP. When PWM is high, S1 is also closed grounding node 212 at the input of the transconductance amplifier 202. Resistor R7 prevents grounding of VOUT while PWM is high. VIN is provided to one end of the inductor L1 and to an input of the transconductance amplifier 202. The switch S1 effectively replicates switch S3 at the other and of the inductor L1 for switching the other input of the transconductance amplifier 202 between ground and VOUT. In this manner, the transconductance amplifier 202 senses the voltage applied across the inductor L1 and generates a corresponding ripple current at its output. The ripple current charges the capacitor CRIPPLE to develop the ripple voltage VRIPPLE. In the ideal case, L1/RS=RRIPPLE*CRIPPLE, in which L1 is the inductance of the inductor L1, RS is the combined series resistance of the sensed path (e.g., including the internal resistance of the inductor L1 and switch resistance), RRIPPLE is the resistance of ripple resistor RRIPPLE, and CRIPPLE is the capacitance of the ripple capacitor CRIPPLE. In this manner, the ripple voltage VRIPPLE effectively replicates the ripple current through the inductor L1 for the boost regulator 200. It is noted that this relationship need not be strictly maintained for the circuit to work.

The comparator 213 asserts PWM high while the voltage of HYST is above the voltage of VRIPPLE. While PWM is high, the transconductance amplifier 214 generates the TWIN current at its output which flows through the resistor R1 to increase the voltage of HYST at node 215 relative to the voltage of ERRORAMP by a window voltage. In this manner, the voltage of 215 switches between the voltage level of ERRORAMP and a hysteresis voltage level which is ERRORAMP added to the window voltage generated by the TWIN current flowing through the resistor R1. The switch S1 is closed so that the transconductance amplifier 202 develops a relatively high ripple current to charge CRIPPLE so that VRIPPLE rises. When VRIPPLE reaches of the voltage of HYST, the comparator 213 switches PWM low which decreases the current output of the transconductance amplifier 214 and thus reduces the voltage of HYST back to about the level of ERRORAMP. Also when PWM goes low, switch S1 is opened reducing the ripple current charging CRIPPLE so that VRIPPLE decreases. When VRIPPLE drops to the reduced voltage of HYST, the comparator 213 switches PWM back high again which increases the voltage of HYST. In this manner, the comparator 213 and the transconductance amplifier 214 collectively form a hysteretic comparator function for comparing the voltages VRIPPLE and ERRORAMP for controlling PWM switching action of the boost regulator 200.

Figure 3:
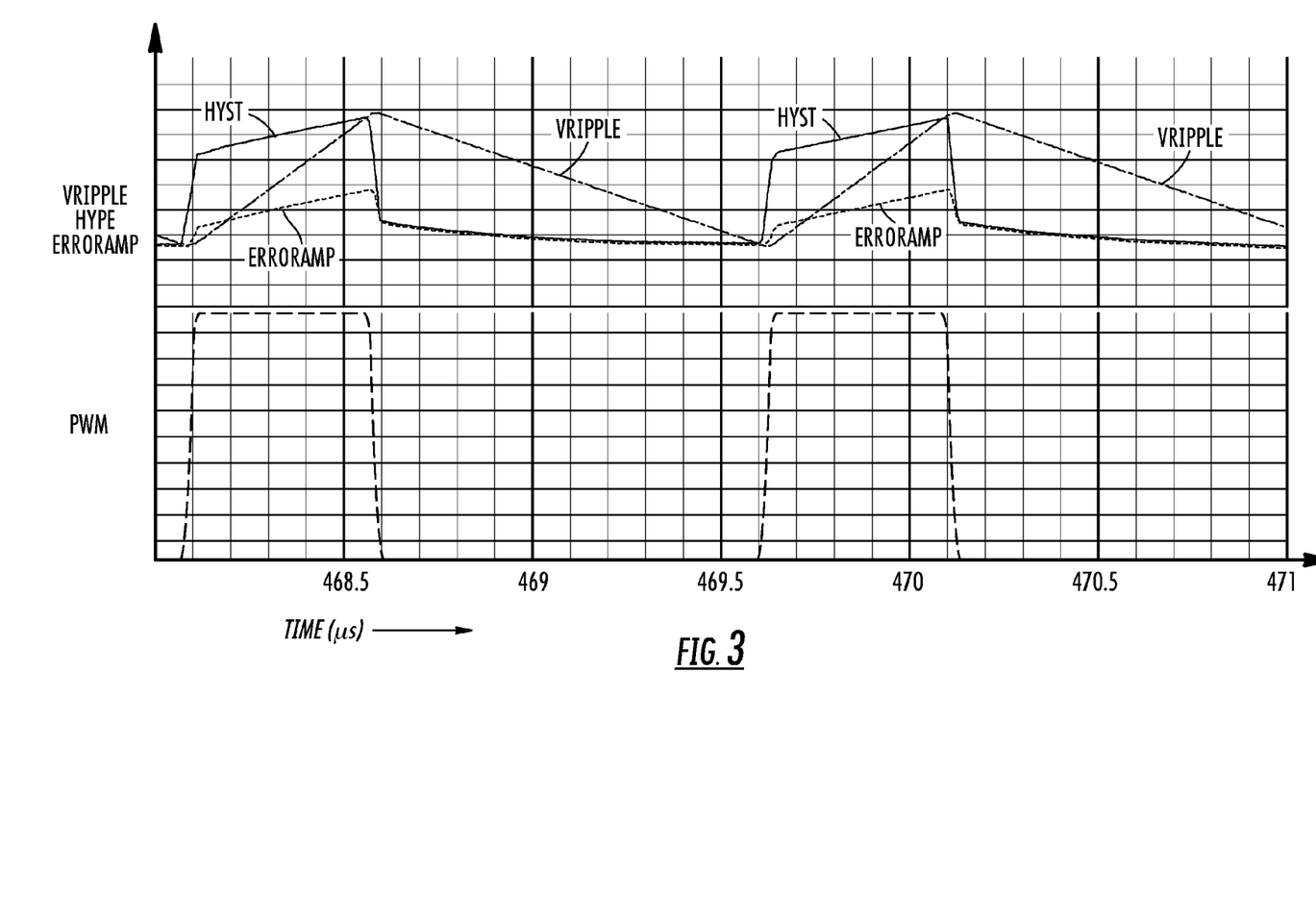
FIG. 3 is a graphic diagram plotting the VRIPPLE, HYST, ERRORAMP and PWM voltages versus time in microseconds illustrating operation of the synthetic ripple regulator of FIG. 2.

FIG. 3 is a graphic diagram plotting the VRIPPLE, HYST, ERRORAMP and PWM voltages versus time in microseconds (μs) illustrating operation of the synthetic ripple regulator 200. The VRIPPLE, HYST and ERRORAMP voltages are superimposed on top of each other illustrating the hysteretic window voltage operation. When the PWM voltage is low, the transconductance amplifier 214 generates little current so that the voltages of HYST and ERRORAMP are about the same. When PWM is high, the transconductance amplifier 214 increases the voltage of HYST relative to ERRORAMP to provide a hysteresis window voltage between the voltage levels of ERRORAMP and HYST. When PWM is high, S1 is closed causing the transconductance amplifier 202 to increase charge current to CRIPPLE so that VRIPPLE ramps up at a constant level. When VRIPPLE reaches the voltage level of HYST, the comparator 213 switches pulling PWM low so that HYST drops to the voltage of ERRORAMP. The switch S1 is opened and VRIPPLE ramps down at a constant rate until it reaches the lower voltage of HYST, causing the comparator 213 to switch again. Operation repeats in this manner.

Figure 4:
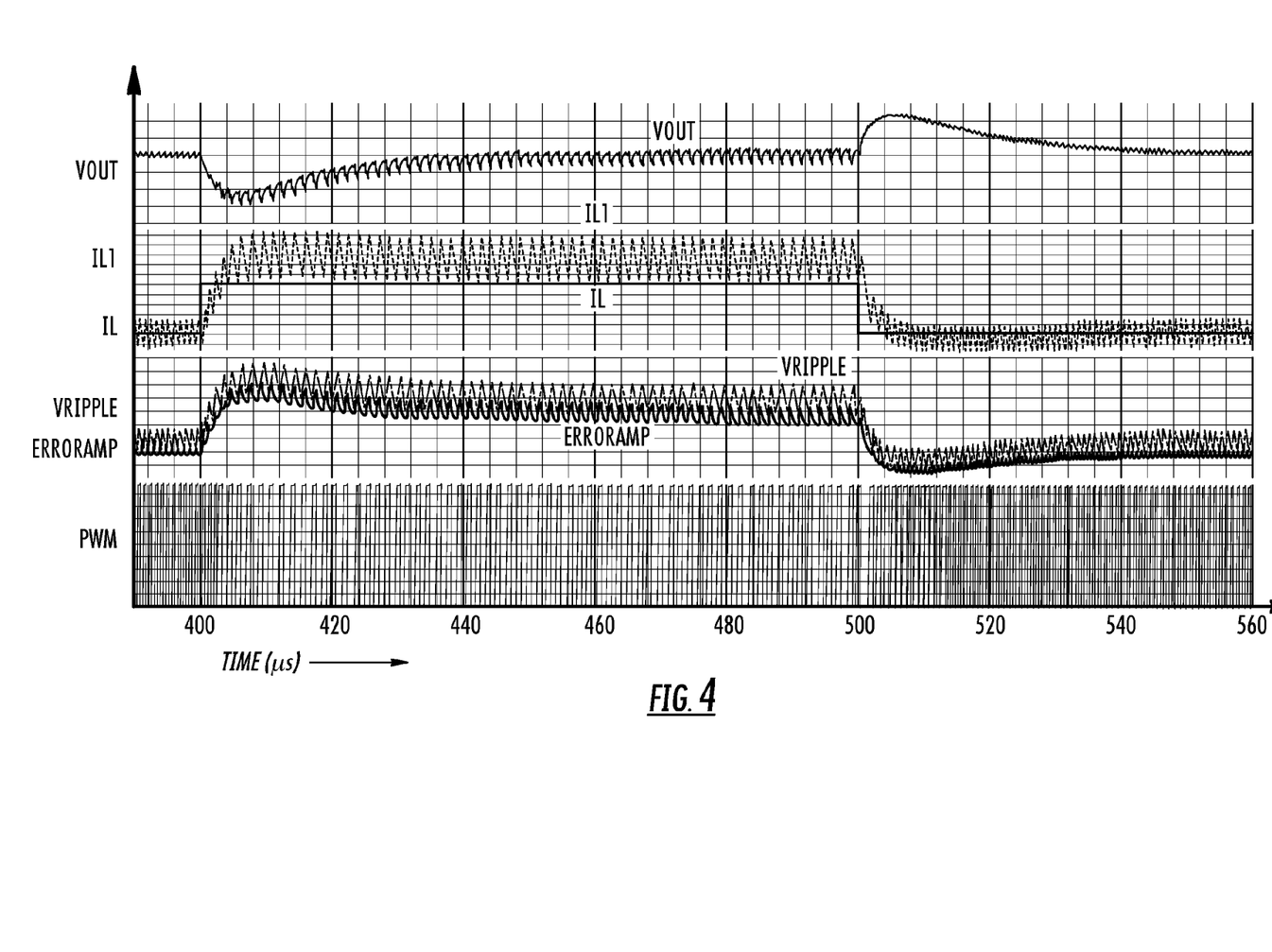
FIG. 4 is a graphic diagram illustrating operation of the synthetic ripple regulator of FIG. 2 during load steps including plots of VOUT, inductor current IL1, load current IL, ripple voltage VRIPPLE, and the voltages of ERRORAMP and PWM versus time in microseconds.

FIG. 4 is a graphic diagram illustrating operation of the synthetic ripple regulator 200 during load steps including plots of VOUT, inductor current IL1, load current IL, ripple voltage VRIPPLE, and the voltages of ERRORAMP and PWM versus time in microseconds. The inductor and load currents IL1 and IL are shown superimposed on top of each other for comparison. The ERRORAMP and VRIPPLE voltages are also shown superimposed on top of each other for comparison. The load current IL begins low during light load conditions, steps up at time 400 for heavy load conditions, and then drops back low again at about time 500 to resume light load conditions. The output voltage VOUT dips after time 400 with increased ripple and then goes back to nominal voltage level after the regulator 200 responds. VOUT then slightly increases after time 500 in response to decrease in load. VRIPPLE effectively follows the inductor current IL1 illustrating synthetic ripple regulation. The ERRORAMP voltage provides the lower ripple value trip point for VRIPPLE, which transitions between ERRORAMP and the hysteresis window voltage developed by the transconductance amplifier 414 providing the HYST voltage.

Figure 5:
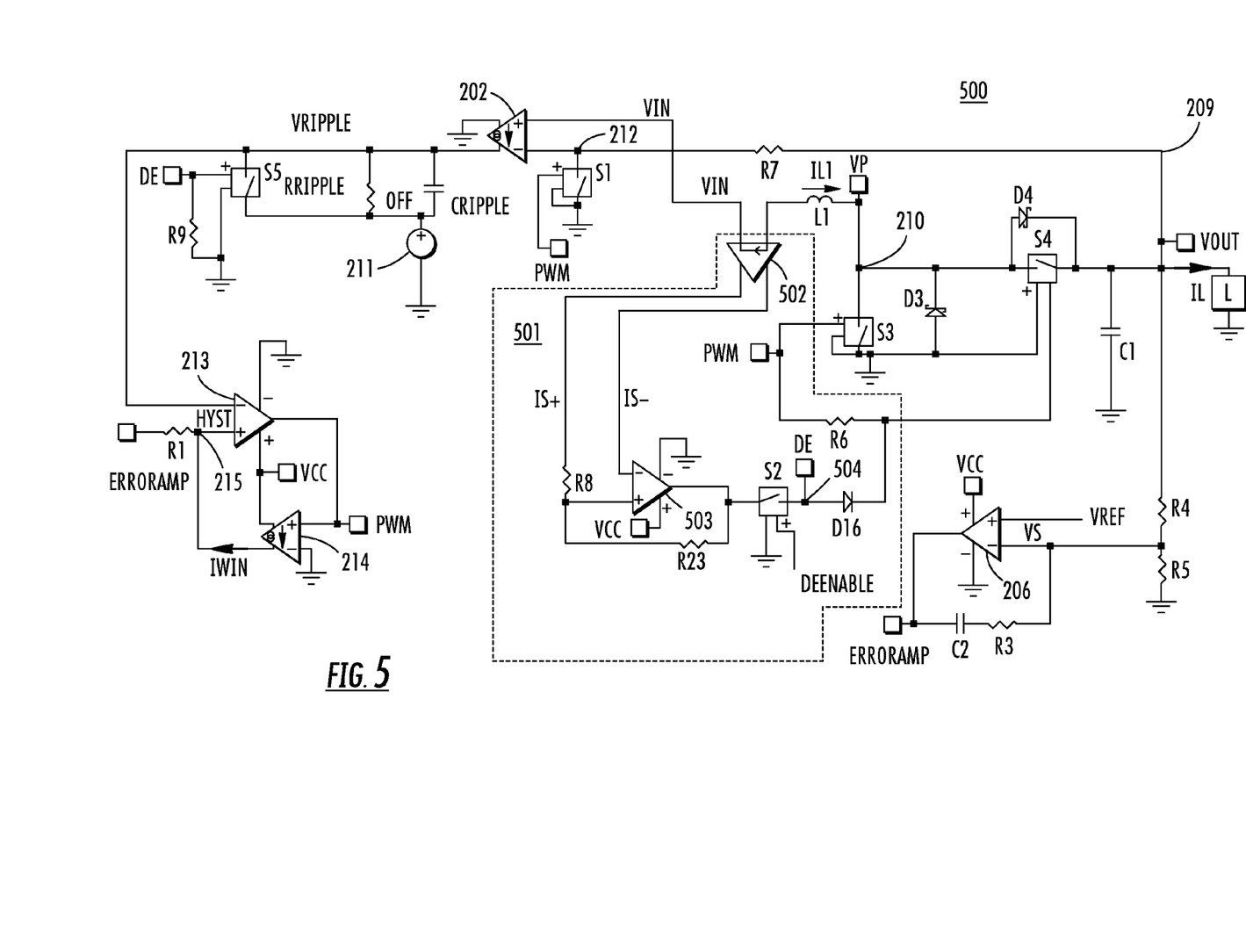
FIG. 5 is a schematic diagram of another boost regulator with synthetic ripple regulation including a diode emulation circuit for implementing a diode emulation mode.

FIG. 5 is a schematic diagram of another boost regulator 500 with synthetic ripple regulation including a diode emulation (DE) circuit 501 for implementing a diode emulation mode. The regulator 500 is similar to the boost regulator 200 in which common components are given identical reference numbers. The DE circuit 501 is provided to improve DCM steady state operation at relatively constant frequency and light load conditions. A current sense amplifier 502 has its input terminals coupled in series with the inductor L1 to sense inductor current IL1 and has an output providing a differential voltage with a first polarity IS+ and a second polarity IS−. The differential voltage IS+/IS− has an amplitude or difference indicative of the inductor current IL1. IS+ is provided through a resistor R8 to a non-inverting input of a comparator 503 receiving IS− at its inverting input. A positive feedback resistor R23 is coupled between the positive input and the output of the comparator 503 providing some hysteresis to avoid chatter of the comparator 503. The output of the comparator 503 is coupled through the switched current terminals of a switch S2 to a node 504 providing a voltage DE and to the anode of a diode D16. The cathode of D16 is coupled to one end of a resistor R6 and to one control input of the switch S4. The other end of the resistor R6 receives the PWM voltage controls the switch S3. The switch S2 is controlled by a diode emulation signal DEENABLE. Another switch S5 has its switched terminals coupled in parallel with RRIPLE and CRIPPLE and is controlled by the DE signal. A resistor R9 is coupled between voltage De and ground.

In operation, when DEENABLE is low to turn off diode emulation, the regulator 500 operates substantially the same as the regulator 200. When DEENABLE is high turning on diode emulation, switch S2 is closed so that the output of the comparator 503 controls the state of DE. When the inductor current IL1 drops to zero as detected by the current sense amplifier 502, the comparator 503 asserts DE high to keep switch S4 off. Also, DE closes switch S5 to clamp the voltage of VRIPPLE to the offset voltage OFF of the voltage source 211. In this manner, a voltage differential clamp is provided for DCM mode to keep VRIPPLE at a specified voltage level during an extended "off" time. This allows the error amplifier 206 to have full control of when an "on" pulse of PWM is needed.

Figure 6:
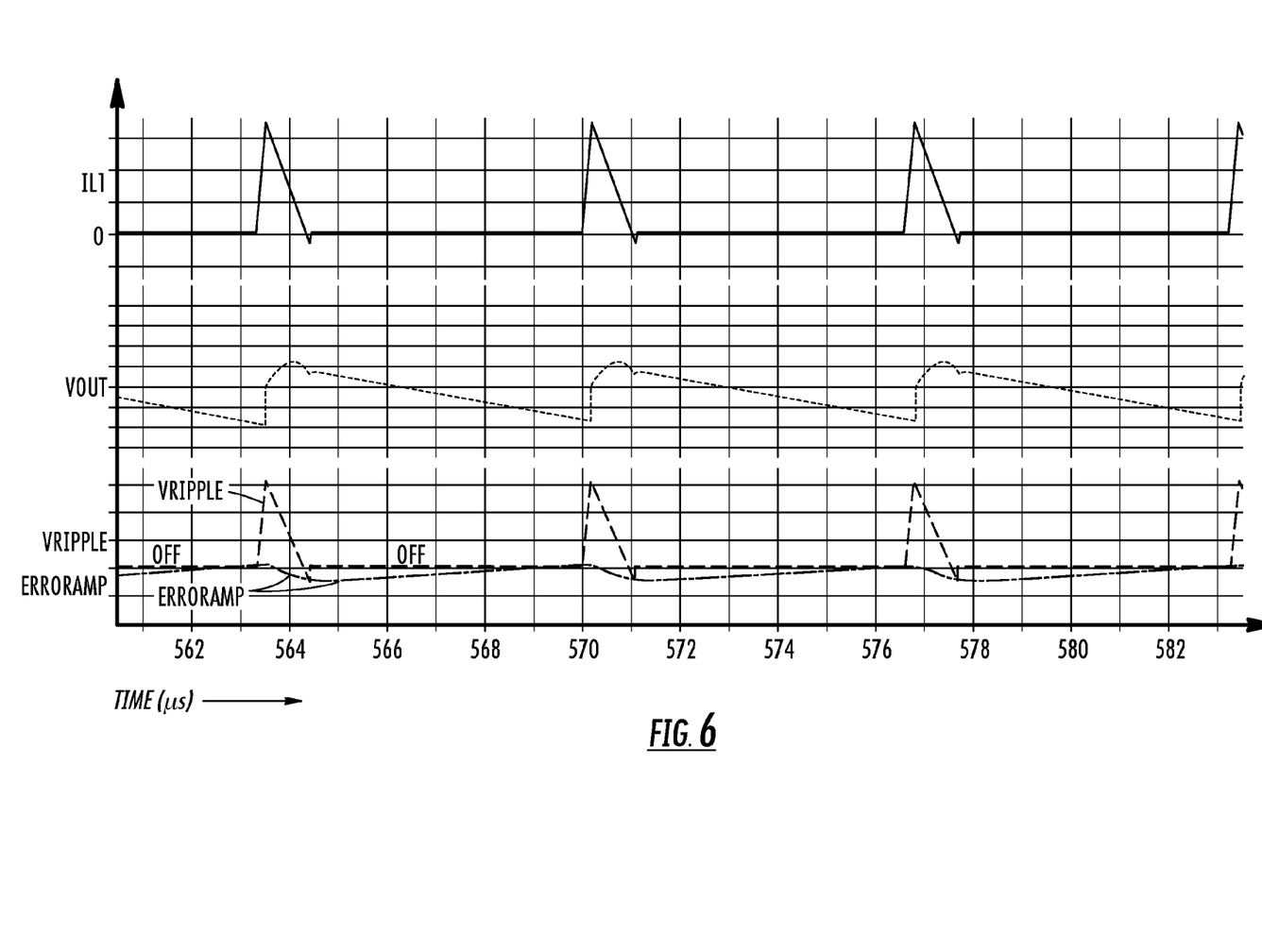
FIG. 6 is a graphic diagram plotting IL1, VOUT, VRIPPLE and ERRORAMP versus time in microseconds illustrating operation of the synthetic ripple regulator of FIG. 1 during diode emulation mode.

FIG. 6 is a graphic diagram plotting IL1, VOUT, VRIPPLE and ERRORAMP versus time in microseconds illustrating operation of the synthetic ripple regulator 500 during diode emulation mode. It is assumed that the DEENABLE signal remains asserted for diode emulation mode for the graphic diagram of FIG. 6. At an initial time 562, VRIPPLE is clamped to the offset voltage OFF of the voltage source 211 while VOUT is decreasing and ERRORAMP is increasing (and PWM is low). The inductor current IL1 is low or zero so that switch S4 is held off. Since PWM is low, S3 is also turned off. After time 563, ERRORAMP reaches the voltage level of VRIPPLE causing the comparator 213 to switch and pull PWM high. When PWM goes high, it turns switch S3 on causing the inductor current IL1 to ramp up above zero. VOUT increases and the VRIPPLE voltage increases following the inductor current IL1. When VRIPPLE reaches the voltage level of HYST (as shown in FIG. 2), the comparator 213 switches and pulls PWM back low again turning the switch S3 off and turning the switch S4 on. The inductor current IL1 starts ramping back down and the VRIPPLE voltage also ramps down following IL1. VOUT begins decreasing as well. When IL1 reaches a predetermined minimum value (such as 0 milliamps (mA) as shown) just after time 564, the comparator 503 switches to pull DE high to turn off switch S4. Also, DE turns on switch S5 to clamp VRIPPLE to the offset voltage OFF. Both of the switches S3 and S4 are turned off while VOUT decreases and ERRORAMP eventually begins increasing again. Both of the switches S3 and S4 remain off during diode emulation until ERRORAMP rises once again to the voltage of VRIPPLE. At about time 570 ERRORAMP rises to VRIPPLE and the cycle repeats in similar manner.

Figure 7:
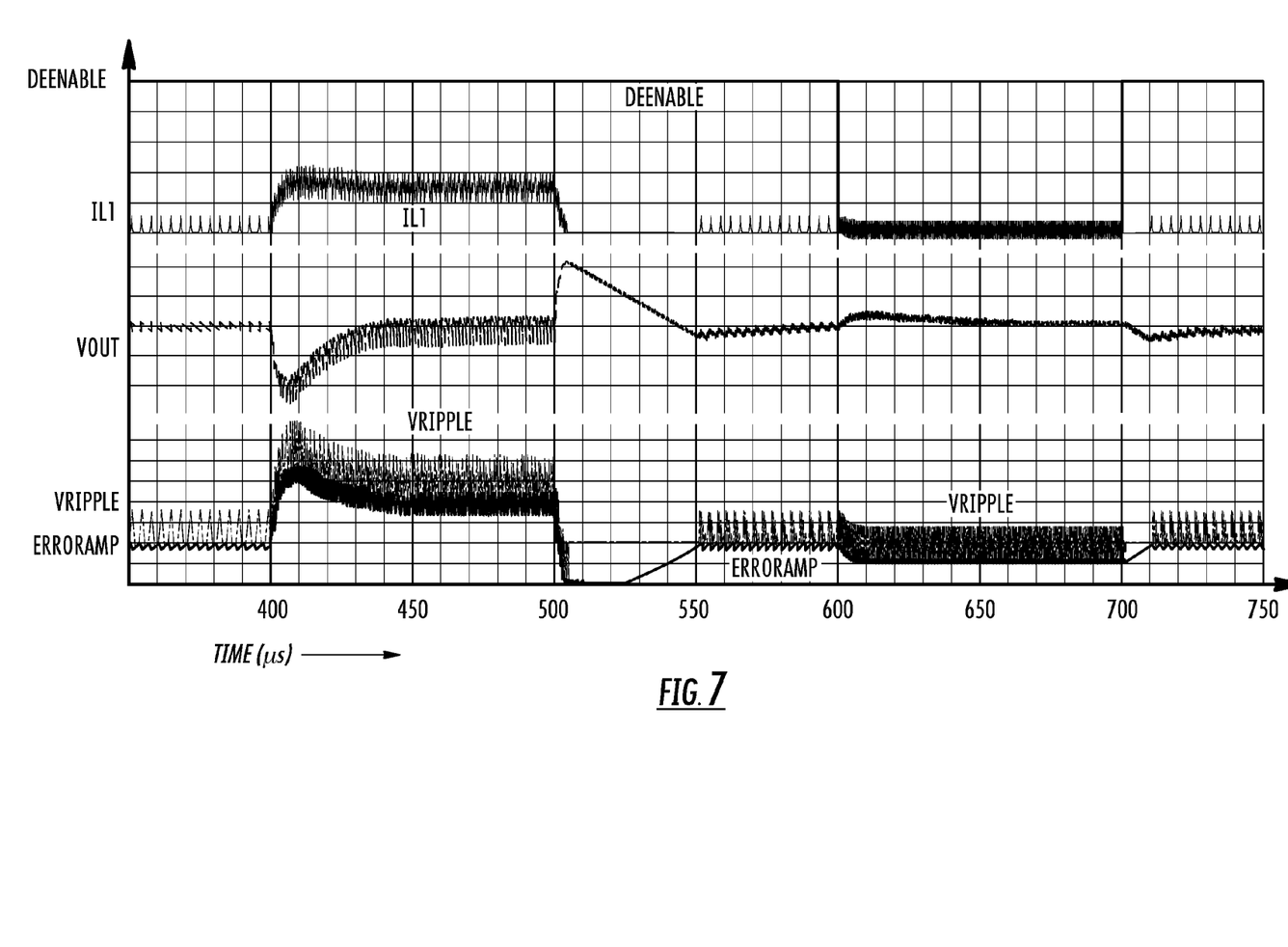
FIG. 7 is a graphic diagram plotting DEENABLE, IL1, VOUT, VRIPPLE and ERRORAMP versus time in microseconds illustrating operation of the synthetic ripple regulator of FIG. 5 while switching between normal and diode emulation modes.

FIG. 7 is a graphic diagram plotting DEENABLE, IL1, VOUT, VRIPPLE and ERRORAMP versus time in microseconds illustrating operation of the synthetic ripple regulator 500 while switching between normal and diode emulation modes. The DEENABLE signal is initially asserted high to enable diode emulation up to a time 600 when it is de-asserted low to disable diode emulation. DEENABLE remains low until subsequent time 700 when it is toggled back high. A step increase in load occurs between times 400 and 500 while diode emulation is enabled. During diode emulation, on pulses are triggered by the ERRORAMP voltage moving up to the clamped ripple capacitor voltage VRIPPLE when the load is light. It is noted that during higher load conditions operation is normal regardless of the state of DEENABLE. Turn off is accomplished with ripple capacitor voltage rising to hit the comparator hysteresis window in a similar manner previously described. In this manner, during diode emulation the regulator 500 operates similar to CM control. When the load is switched back low again at time 500, VOUT jumps up a little and the VRIPPLE voltage is clamped until subsequent time 550. When VOUT falls just below its nominal level at about time 550 during the diode emulation mode, synthetic ripple regulation begins continues with diode emulation keeping IL1 from falling below 0 mA. When the DEENABLE signal is asserted low at time 600, normal ripple regulation mode continues.

Output disturbance is minimal with diode emulation mode toggled on and off. It is noted that even when diode emulation is enabled, the DE circuit 501 has little or no effect until inductor current IL1 falls to a minimum level, such as 0 mA. In the load step case, DE is only active during low load conditions. When the load increases, the DE circuit 501 does not affect circuit operation. During normal ripple regulation mode, the ripple on the output voltage VOUT is kept relatively minimal and the synthetic ripple regulation feedback control provides fast response to load transients.

The boost regulator 200 provides the desired boost function for the battery-powered electronic device 100. The boost regulator 200 maintains the voltage of VOUT at a desired regulated voltage level while the voltage of VIN varies within a lower voltage range, such as provided by a battery. The boost regulator maintains relatively high efficiency operation with relatively low output ripple. Diode emulation may be selectively enabled or disabled depending upon the particular device and/or implementation. Diode emulation mode enables higher efficiency under light load conditions.

The particular circuits shown and described are exemplary only and may other versions and variations are possible. The synthetic ripple generation circuit 201 may be implemented in any one of many different ways. For example, the transconductance amplifier 202 may have its input terminals coupled directly across the terminals of the inductor L1 rather than using the resistor R7 and the switch S1 to achieve similar effect. Also, a reference voltage having a voltage equal to the desired nominal level of VOUT may be provided through the resistor R7 to the transconductor amplifier 202 rather than VOUT. In general, the synthetic ripple generation circuit 201 synthetically replicates ripple current through the inductor L1 based on voltage applied across the inductor. The replicated ripple current is then provided to charge a ripple capacitor forming the ripple voltage which replicates ripple current through the inductor L1. A voltage waveform may be readily generated by noting that the current through a voltage-driven inductor is equivalent to the voltage across a current-driven capacitor. In this manner, driving a ripple capacitor with a current proportional to the voltage across the inductor L1 provides the desired waveform shape for controlling the regulator.

The switches S1-S4 may be implemented with field-effect transistors (FETs) or the like as understood by those or ordinary skill in the art. The electronic switches S3 and S4 may be implemented as metal-oxide semiconductor FETs (MOSFETs) or the like for handling the currents through the inductor. A gate driver circuit (not) shown may be provided to drive the gates of the MOSFET electronic switches based on the PWM signal as understood by those or ordinary skill in the art.

Figure 8:
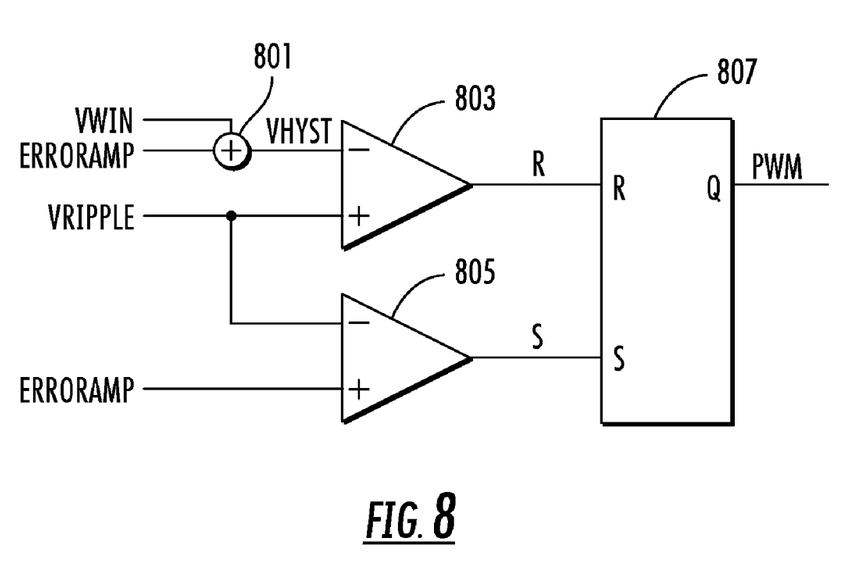
FIG. 8 is a schematic diagram illustrating an alternative embodiment of the hysteretic comparator circuit of FIGS. 2 and 5.

Furthermore, the hysteretic comparator circuit 203 may be implemented in any one of numerous ways to achieve similar results. As shown in FIG. 8, for example, a combiner 801 (e.g., adder) adds a window voltage VWIN to ERRORAMP to develop a hysteresis voltage VHYST provided to the inverting input of a first comparator 803. VRIPPLE is provided to the non-inverting input of the comparator 803 and to the inverting input of another comparator 805, which receives the ERRORAMP voltage at is non-inverting input. The comparator 803 provides a reset (R) signal to the reset input of a logic circuit 807 and the comparator 805 provides a set (S) signal to the set input of the logic circuit 807. The logic circuit provides the PWM signal at its non-inverting output. The logic circuit 807 may be implemented as a flip-flop or the like, such as, for example, a set-reset (SR) flip-flop. When PWM is high, VRIPPLE ramps up until it reaches the voltage level of VHYST causing the comparator 803 to switch and assert the reset signal R to reset the logic circuit 807. The logic circuit 807 pulls PWM low so that VRIPPLE ramps down re-switching the comparator 803 to de-assert the reset signal. When the voltage of VRIPPLE falls back to the level of ERRORAMP, the comparator 805 switches and asserts the set signal S to set the logic circuit 807, which asserts the PWM signal back high again. VRIPPLE ramps up again and the comparator 807 de-asserts the set signal. Operation repeats in this manner.

Although the present invention has been described in considerable detail with reference to certain preferred versions thereof, other versions and variations are possible and contemplated. For example, the non-inverting input of the transconductance amplifier 202 is shown coupled directly to VIN, whereas this input may alternatively be coupled to a corresponding voltage indicative of VIN, such as using a voltage divider circuit or other sense circuitry and the like. If a corresponding voltage level is used other than actual voltage level, then the gain of the transconductance amplifier 202 may be adjusted accordingly. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A boost regulator for converting an input voltage to a higher output voltage, comprising:
    an inductor having a first end receiving the input voltage and a second end;
    an error circuit which determines an error of the output voltage and which provides an error voltage indicative thereof;
    a switching circuit which switches said second end of said inductor between the output voltage and ground as controlled by a pulse width modulation signal;
    a ripple circuit which synthetically replicates ripple current through said inductor based on voltage applied across said inductor and which provides a ripple voltage indicative thereof; and
    a hysteretic comparator circuit which develops said pulse width modulation signal based on comparing said ripple voltage within a hysteretic window voltage range based on said error voltage.

2. The boost regulator of claim 1, wherein said switching circuit comprises:
    a first electronic switch having current terminals coupled between said second end of said inductor and ground and having a control terminal receiving said pulse width modulation signal;
    a second electronic switch having current terminals coupled between said second end of said inductor and an output node developing the output voltage and having a control terminal receiving said pulse width modulation signal; and
    wherein said first electronic switch is turned on while said second electronic switch is turned off and wherein said first electronic switch is turned off while said second electronic switch is turned on.

3. The boost regulator of claim 1, wherein said ripple circuit comprises:
    a ripple capacitive circuit; and an amplifier circuit having an input for determining voltage applied across said inductor and an output providing a ripple current proportional to said voltage applied across said inductor to charge said ripple capacitive circuit.

4. The boost regulator of claim 1, wherein said ripple circuit comprises:
a ripple capacitive circuit which develops said ripple voltage on a first node;
a switch having a control input receiving said pulse width modulation signal and having current terminals coupled between a second node and ground, wherein said switch switches said second node between the output voltage and ground based on said pulse width modulation signal; and
a transconductance amplifier having a first input receiving a voltage indicative of the input voltage, a second input coupled to said second node, and an output coupled to said first node for providing a ripple current to said ripple capacitive circuit.

5. The boost regulator of claim 4, wherein said ripple capacitive circuit comprises:
a ripple capacitor and a ripple resistor coupled in parallel between said first node and a third node; and
an offset voltage source coupled between ground and said third node.

6. The boost regulator of claim 1, wherein said hysteretic comparator circuit comprises:
a hysteretic circuit which switches a first node, based on said pulse width modulation signal, between said error voltage and a hysteresis voltage, wherein said hysteresis voltage comprises said error voltage added to a window voltage; and
a comparator which compares said ripple voltage with the voltage of said first node and which provides said pulse width modulation signal indicative thereof.

7. The boost regulator of claim 1, wherein said hysteretic comparator circuit comprises:
a combiner which combines a window voltage with said error voltage and which provides a hysteresis voltage;
a first comparator which compares said hysteresis voltage with said ripple voltage and which provides a reset signal indicative thereof;
a second comparator which compares said ripple voltage with said error voltage and which provides a set signal indicative thereof; and
a logic circuit which receives said set and reset signals and which toggles said pulse width modulation signal based on said set and reset signals.

8. The boost regulator of claim 1, further comprising:
said switching circuit comprising an electronic switch having a pair of current terminals coupled between said second end of said inductor and an output node which develops the output voltage; and
a diode emulation circuit which keeps said electronic switch turned off during a diode emulation mode to decouple said output node from said second end of said inductor when current through said inductor reaches a minimum level.

9. The boost regulator of claim 8, wherein said diode emulation circuit comprises:
a current sensor which senses current through said inductor and which asserts a current sense signal indicative thereof; and
a comparator circuit having an input coupled to said current sensor and an output coupled to control said electronic switch.

10. The boost regulator of claim 8, further comprising a clamp circuit which clamps said ripple voltage to a predetermined level when said electronic switch is kept off during said diode emulation mode.

11. An electronic device, comprising:
a power source providing an input voltage;
a load which receives a source voltage which is higher than said input voltage; and
a boost regulator for converting said input voltage to said source voltage, said boost regulator comprising:
an inductor having a first end receiving the input voltage and a second end;
an error circuit which determines an error of said source voltage and which provides an error voltage indicative thereof;
a switching circuit which switches said second end of said inductor between said source voltage and ground as controlled by a pulse width modulation signal;
a ripple circuit which synthetically replicates ripple current through said inductor based on voltage applied across said inductor and which provides a ripple voltage indicative thereof; and
a hysteretic comparator circuit which provides said pulse width modulation signal based on comparing said ripple voltage within a hysteretic window voltage range based on said error voltage.

12. The electronic device of claim 11, wherein said ripple circuit comprises:
a ripple capacitive circuit; and
an amplifier circuit having an input which senses voltage applied across said inductor and an output providing a ripple current proportional to said voltage applied across said inductor to charge said ripple capacitive circuit.

13. The electronic device of claim 11, wherein said ripple circuit comprises:
ripple capacitive circuit which develops said ripple voltage on a first node;
a switch having a control input receiving said pulse width modulation signal and having current terminals coupled between a second node and ground, wherein said switch switches said second node between the source voltage and ground based on said pulse width modulation signal; and
a transconductance amplifier having a first input receiving a voltage indicative of the input voltage, a second input coupled to said second node, and an output coupled to said first node for providing a ripple current to said ripple capacitive circuit.

14. The electronic device of claim 13, wherein said ripple capacitive circuit comprises:
a ripple capacitor and a ripple resistor coupled in parallel between said first node and a third node; and
an offset voltage source coupled between ground and said third node.

15. The electronic device of claim 11, wherein said hysteretic comparator circuit comprises:
a hysteretic circuit which switches, based on said pulse width modulation signal, a first node between said error voltage and a hysteresis voltage, wherein said hysteresis voltage comprises said error voltage added to a window voltage; and
a comparator which compares said ripple voltage with the voltage of the first node and which provides said pulse width modulation signal indicative thereof.

16. The electronic device of claim 11, wherein said hysteretic comparator circuit comprises:

a combiner which combines said window voltage with said error voltage and which provides a hysteresis voltage;

a first comparator which compares said hysteresis voltage with said ripple voltage and which provides a reset signal indicative thereof;

a second comparator which compares said ripple voltage with said error voltage and which provides a set signal indicative thereof; and a logic circuit which receives said set and reset signals and which toggles said pulse width modulation signal based on said set and reset signals.

17. The electronic device of claim 11, further comprising:
said switching circuit comprising an electronic switch having a pair of current terminals coupled between said second end of said inductor and an output node developing said source voltage; and a diode emulation circuit which keeps said electronic switch turned off to decouple said output node from said second end of said inductor while current through said inductor is at a minimum level.

18. The electronic device of claim 11, wherein said power source comprises a battery.

19. A method of controlling a boost regulator which converts an input voltage to an output voltage, comprising:
applying the input voltage to a first end of an inductor;
switching a second end of the inductor between the output voltage and ground as controlled by a pulse width modulation signal;
determining an error of the output voltage and providing an error voltage indicative thereof;
synthetically replicating ripple current through the inductor based on voltage applied across said inductor and providing a ripple voltage indicative thereof; and
comparing the ripple voltage within a window voltage range based on the error voltage and providing the pulse width modulation signal indicative thereof.

20. The method of claim 19, further comprising:
switching a first node between the output voltage and ground based on the pulse width modulation signal; and
wherein said synthetically replicating ripple current through the inductor based on voltage applied across said inductor and providing a ripple voltage indicative thereof comprises:
determining a difference voltage between the input voltage and the voltage of the first node and converting the difference voltage to a ripple current indicative thereof; and
charging a capacitor with the ripple current.

21. The method of claim 19, wherein said comparing the ripple voltage within a window voltage range based on the error voltage and providing the pulse width modulation signal indicative thereof comprises:
asserting the pulse width modulation signal to cause current through the inductor when the ripple voltage falls to a voltage level of the error voltage; and
de-asserting the pulse width modulation signal when the ripple voltage rises to a voltage level of the error voltage plus a window voltage.

22. The method of claim 19, further comprising:
said switching a second end of the inductor comprising turning on a first switch to couple the second end of the inductor to an output node which develops the output voltage and turning off the first switch to decouple the second end of the inductor from the output node; and
keeping the first switch turned off for diode emulation when the current through the inductor drops to a minimum current level.

23. The method of claim 22, further comprising clamping the ripple voltage to a predetermined level when the first switch is kept turned off for diode emulation.

* * * * *